(12) United States Patent
Zhang

(10) Patent No.: US 11,333,958 B2
(45) Date of Patent: May 17, 2022

(54) LASER POINT PROJECTING DEVICE

(71) Applicant: CHANGZHOU HUADA KEJIE OPTO-ELECTRO INSTRUMENT CO., LTD., Jiangsu (CN)

(72) Inventor: Ou Zhang, Zhejiang (CN)

(73) Assignee: CHANGZHOU HUADA KEJIE OPTO-ELECTRO INSTRUMENT CO., LTD., Changzhou (CN)

( * ) Notice: Subject to any disclaimer, the term of this patent is extended or adjusted under 35 U.S.C. 154(b) by 152 days.

(21) Appl. No.: 16/641,292

(22) PCT Filed: Jun. 1, 2018

(86) PCT No.: PCT/CN2018/089591
§ 371 (c)(1),
(2) Date: Feb. 24, 2020

(87) PCT Pub. No.: WO2019/037508
PCT Pub. Date: Feb. 28, 2019

(65) Prior Publication Data
US 2020/0192207 A1 Jun. 18, 2020

(30) Foreign Application Priority Data
Aug. 22, 2017 (CN) .......................... 201721056628.9

(51) Int. Cl.
*G03B 21/00* (2006.01)
*G03B 21/20* (2006.01)
(Continued)

(52) U.S. Cl.
CPC ....... *G03B 21/2033* (2013.01); *G01D 13/265* (2013.01); *G03B 21/2046* (2013.01); *F21Y 2115/30* (2016.08); *G03B 21/145* (2013.01)

(58) Field of Classification Search
CPC .............. G01D 13/265; G03B 21/2033; G03B 2215/0567; G03B 21/2046; G03B 21/145; G03B 21/20; F21Y 2115/30
See application file for complete search history.

(56) References Cited

U.S. PATENT DOCUMENTS 3,858,984 A 1/1975 Denton et al.
5,182,863 A 2/1993 Rando
(Continued)

FOREIGN PATENT DOCUMENTS

CN 204883062 U 12/2015
CN 105241436 A 1/2016
(Continued)

OTHER PUBLICATIONS

Extended Search Report dated Apr. 7, 2021 in corresponding European Patent Application No. 18847994.3, 8 pages.
(Continued)

*Primary Examiner* — Y M. Quach Lee
(74) *Attorney, Agent, or Firm* — Dentons US LLP

(57) ABSTRACT

A laser point projecting device including a light source assembly that projects first and second positioning points respectively along two directions of a straight line. The laser point projecting device includes a housing part forming a sleeve around a body part. The body part and the housing part are displaceable relative to each other. The light source assembly is switched off when the body part is displaced to a first position along the direction of projecting the first positioning point; and the light source assembly is activated when the body part is displaced to a second position along the direction of projecting the second positioning point. The housing part has at least one opening at the end along the direction of projecting the first positioning point, and a hollow space formed between the end of the housing part close to the first positioning point and the body part.

10 Claims, 3 Drawing Sheets

(51) Int. Cl.
*G01D 13/26* (2006.01)
*G03B 21/14* (2006.01)
*F21Y 115/30* (2016.01)

(56) References Cited

U.S. PATENT DOCUMENTS

| | | | | |
|---|---|---|---|---|
| 5,450,148 A * | 9/1995 | Shu | ................. | G02B 27/20 |
| | | | | 362/259 |
| 7,896,523 B2 * | 3/2011 | Drolshagen | ........ | G02B 27/0955 |
| | | | | 362/259 |
| 2015/0204666 A1 | 7/2015 | Hill | | |

FOREIGN PATENT DOCUMENTS

| CN | 205619932 U | 10/2016 |
|---|---|---|
| DE | 8808431 U1 | 8/1988 |

OTHER PUBLICATIONS

International Search Report and Written Opinion dated Aug. 6, 2018 in corresponding International Patent Application No. PCT/CN2018/089591, filed Jun. 1, 2018, 9 pages.

* cited by examiner

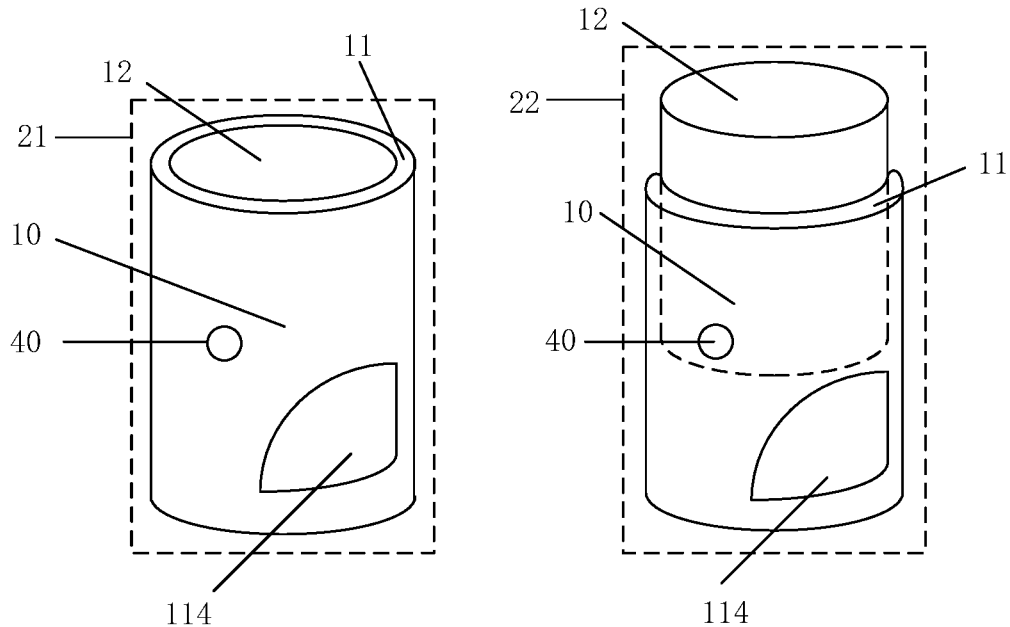
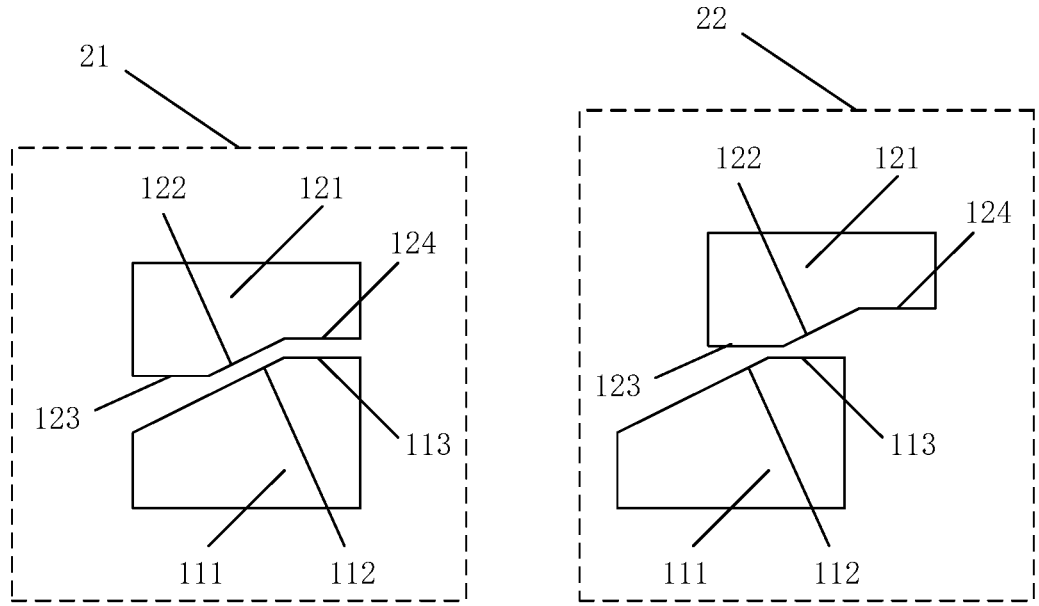
Figure 1
Figure 2

LASER POINT PROJECTING DEVICE

CROSS-REFERENCE TO PRIOR APPLICATIONS

This application is a National Stage of PCT/CN2018/089591, filed Jun. 1, 2018, and designating the United States of America (published on Feb. 28, 2019, as WO 2019/037508A1), which claims priority under 35 U.S.C. § 119 to Chinese Patent Application No. 201721056628.9, filed Aug. 22, 2017, each hereby expressly incorporated by reference in its entirety and each assigned to the assignee hereof.

TECHNICAL FIELD

The present utility model relates to the field of laser, and in particular to a laser point projecting device.

BACKGROUND

Nowadays, laser devices are widely applied in engineering field. In fields such as building construction, mining and transportation facility construction, a large amount of laser devices are needed to carry on positioning and distance measuring, which have advantages of high precision, long measuring distance, etc. Currently, in the building construction field, laser point and line projecting meters are the most common instruments, which can be divided into different products according to geometric features of the emitted lasers thereof, such as instruments projecting point-shaped lasers, instruments projecting horizontal and straight lasers, and instruments projecting perpendicular, intersecting and straight-line lasers.

The point and line projecting meter in the prior art has complex operations during working for a ceiling, and a user usually needs to find a corresponding point on the ceiling with reference to a position on the ground, then performs a fixed-point construction. However, when an existing point and line projecting meter capable of projecting the upper and lower positioning points are placed on the ground, the lower positioning point is invisible, and a specific bracket is needed to complete the work, which leads to a cumbersome process and low working efficiency. Therefore, it is necessary to design a compact laser point projecting device dedicated to the ceiling work for the convenience of the users.

SUMMARY

For overcoming the aforementioned technical problems, the objective of the present utility model is to enable the laser point projecting device to be compact and convenient positioning.

The present utility model discloses a laser point projecting device, comprising a light source assembly which projects a first positioning point and a second positioning point respectively along two directions of a straight line. The laser point projecting device comprises a housing part and a body part, wherein the housing part is sleeved on the periphery of a body part, and the body part and the housing part are displaceable relative to each other. When the body part displaces to a first position along the direction of projecting the first positioning point, the laser point projecting device assumes a first status, with the light source assembly switched off; when the body part displaces to a second position along the direction of projecting the second positioning point, the laser point projecting device assumes a second status, with the light source assembly activated. The housing part is provided with at least one opening at the end along the direction of projecting the second positioning point, and when the laser point projecting device assumes the second status, a hollow space is formed between the end of the housing part close to the first positioning point and the body part, and the opening acts as an observation window to communicate the hollow space and the external space.

Preferably, the opening is fan-shaped.

Preferably, the laser point projecting device is shaped to be a cylinder, the axis of which is parallel to the straight line.

Preferably, the housing part is provided on its surface with a first projection part comprising a first spiral inclined surface; the body part is provided on its surface with a second projection part comprising a second spiral inclined surface; and the first spiral inclined surface and the second spiral inclined surface are provided oppositely, such that when the body part switches between the first position and the second position, the screw threads of the first spiral inclined surface and the second spiral inclined surface are engaged.

Preferably, the first projection part further comprises a first plane provided at the upper end of the first projection part and parallel to the bottom surface of the cylinder; the second projection part further comprises a second plane provided at the lower end of the second projection part and parallel to first plane; when the laser point projecting device assumes the first status, the first spiral inclined surface are in contacts with the second spiral inclined surface; and when the laser point projecting device assumes the second status, the body part is rotated to bring the first plane and the second plane into contact, preventing the displacement of the body part relative to the housing part.

Preferably, the housing part is provided on its surface with a first groove which extends along the axial direction; the body part is provided on its surface with a third projection part which extends in a direction parallel to the first groove; the third projection part is embedded in the first groove, such that the body part displaces relative to the housing part along the axial direction.

Preferably, the housing part is provided on its surface with a second groove which extends along the radial direction of the cylinder; the body part is provided on its surface with a fourth projection part which extends in a direction parallel to the second groove; when the laser point projecting device assumes the second status, the fourth projection part is embedded in the second groove, preventing the displacement of the body part relative to the housing part.

Preferably, the laser point projecting device further comprises a switch; when the laser point projecting device assumes the first status, the switch is not triggered, and the laser point projecting device is off; when the laser point projecting device assumes the second status, the switch is triggered, and the laser point projecting device is switched on.

Preferably, the switch is of a press-to-trigger type, provided on the upper lateral surface of the body part, and connecting in series with the power circuit within the laser point projecting device; when the laser point projecting device assumes a first status or a second status, the switch is pressed or bounced up, altering the power circuit between the states of being cut-off and being connected.

Preferably, the laser point projecting device further comprises a switch button provided on the surface of the housing part for receiving an external operation to switch on or off the laser point projecting device.

Comparing with the prior art, the above-mentioned technical solution has the following beneficial effects that:

1. the added design of the opening enables a user to observe the positions of both the two positioning points of the laser point projecting device during operation, thereby facilitating positioning;

2. the laser point projecting device is compact and portable, achieving the effects of miniaturization, and facilitates the user to operate;

3. the design of the switch is simplified, and the whole structure of the laser point projecting device is optimized to be attractive and practical.

BRIEF DESCRIPTION OF THE DRAWINGS

FIG. 1 is a schematic structural view of a laser point projecting device according to a preferred embodiment of the present utility model.

FIG. 2 is a schematic view of the specific structure of a laser point projecting device according to a preferred embodiment of the present utility model.

REFERENCE NUMERALS

Figure 3:
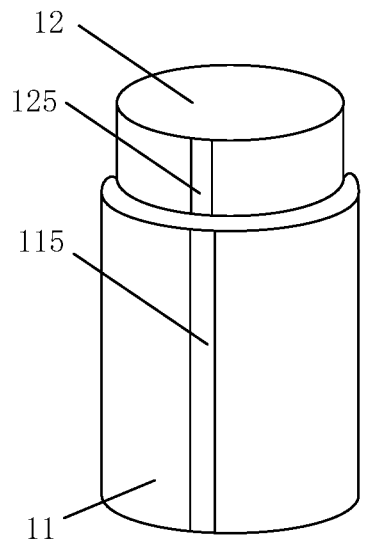
FIG. 3 is a schematic view of the specific structure of the laser point projecting device according to another preferred embodiment of the present utility model.

10—laser point projecting device, 11—housing part, 111—first projection part, 112—first spiral inclined surface, 113—first plane, 114—opening, 115—first groove, 116—second groove, 12—body part, 121—second projection part, 122—second spiral inclined surface, 123—second plane, 124—third plane, 125—third projection part, 126—fourth projection part, 21—first status, 22—second status, 31—first positioning point, 32—second positioning point, 40—switch.

DETAILED DESCRIPTION

Hereinafter the advantages of the present utility model will be further described in conjunction with the accompanying drawings and specific embodiments.

Referring to FIG. 1, it is a schematic structural view of a laser point projecting device according to a preferred embodiment of the present utility model, wherein the laser point projecting device 10 includes:

A Housing Part 11

The housing part 11 is provided outside the laser point projecting device 10, and sleeved on the periphery of a body part 12. The laser point projecting device 10 in the present embodiment is cylindrical, thus the housing part 11 is also cylindrical.

A Body Part 12

The body part 12 is provided inside the laser point projecting device 10, and plays an important role in laser point projection. The body part 12 is provided therein with a light source assembly which projects a first positioning point 31 and a second positioning point 32 respectively along the two directions of a straight line. In this present embodiment, the laser point projecting device 10 is cylindrical, thus the direction of the straight line and the axis of the cylinder are parallel. The first positioning point 31 and the second positioning point 32 are projected from the two bottom surfaces of the body part 12. The body part 12 is displaceable relative to the housing part 11, that is, the body part 12 and the housing part 11 can move relative to each other, enabling the laser point projecting device 10 to assume a first status 21 or a second status 22. FIG. 1 illustrates the first status 21 and the second status 22. When the laser point projecting device 10 assumes a first status 21, the body part 12 moves toward the first positioning point 31, until it aligns with the housing part 11 completely, that is, the body part 12 assumes a first position when the axial length of the laser point projecting device 10 is the minimum; when the laser point projecting device 10 assumes the second status 22, the body part 12 is pulled relative to the housing part 11 toward the second positioning point 32 in the axial direction, that is, the body part 12 assumes a second position when the axial length of the laser point projecting device 10 is the maximum. When the laser point projecting device 10 alters between the first status 21 and the second status 22, the body part 12 can be directly displaced in the axial direction, and the displacement trajectory thereof is a straight line along the axial direction; the body part 12 can also be displaced in a spiral manner, with the displacement trajectory that is a spiral line around the axis of the body part.

An Opening 114

The housing part 11 is provided with at least one opening 114, which can be fan-shaped, circle-shaped, square-shaped, rectangle-shaped, triangle-shaped, or other geometrical shapes, and acts as an observation window. When the laser point projecting device 10 assumes the second status 22, the body part 12 protrudes toward the second positioning point 32, the end of the housing part 11 close to the first positioning point 31 forms a hollow space, and the opening 114 works as an observation window to communicate the hollow space with the external space. A user is able to observe the circumstance in the hollow space, especially, when the laser point projecting device 10 is placed on the ground, the position of the first positioning point 31 can be observed through the opening 114, thereby facilitating the user to carry on the positioning operation, without the assistance of an extra bracket structure, and very conveniently.

As a further improvement on the laser point projecting device 10, the laser point projecting device 10 further includes:

A Switch 40

The switch 40 is provided on the laser point projecting device 10, for switching on or off the laser point projecting device 10. The switch 40 could be constituted by a button, a key, or a rocker switch, and connected with a power source in the laser point projecting device 10 for connecting or cutting off the supply circuit.

As a further improvement on the laser point projecting device 10, the switch 40 is provided on the body part 12, and when the laser point projecting device 10 assumes the first status, the switch 40 is not triggered, and the laser point projecting device 10 is off; when the laser point projecting device 10 assumes the second status, the switch 40 is triggered, and the laser point projecting device 10 is switched on. The user only needs to control the status of the laser point projecting device 10 so as to switch it on or off synchronously. For instance, the switch 40 takes such a type that is turned off when pressed, and can be provided on the upper lateral surface of the body part 12. When the laser point projecting device 10 assumes the first status, the upper end of the body part 12 aligns with that of the housing part 11, and the switch 40 is pressed to cut off the power circuit;

when the laser point projecting device 10 assumes the second status, the upper end of the body part 12 protrudes from the housing part 11, the switch 40 is not pressed, and the power circuit is closed.

As a further improvement on the laser point projecting device 10, the switch 40 can also be provided on the external surface of the housing part 11 and implemented in the form of a switch button. A user is able to operate the switch 40 to allow the laser point projecting device 10 to assume a switched-on or switched-off status.

Referring to FIG. 2, it is a schematic view of the specific structure of the laser point projecting device 10 according to a preferred embodiment of the present utility model. The lateral surface of the cylinder constituted by the laser point projecting device 10 in FIG. 2 is unfolded to be a plane to illustrate the specific structure clearly. The housing part 11 includes:

A First Projection Part 111

The first projection part 111 is provided on the surface of the housing part 11, and includes a first spiral inclined surface 112 and a first plane 113. The first spiral inclined surface 112 is orthogonal to the lateral surface of the cylinder constituted by the laser point projecting device 10, and at an angle with the bottom surface of the cylinder. The first plane 113 is parallel to the bottom surface of the cylinder.

A Second Projection Part 121

The second projection part 121 is provided on the surface of the body part 12, and includes a second spiral inclined surface 122, a second plane 123, and a third plane 124. The second spiral inclined surface 122 is parallel to the first spiral inclined surface 112. The second plane 123 is parallel to the first plane 113, and the third plane 124 is parallel to the first plane 113.

In FIG. 2, the left part shows the situation when the laser point projecting device 10 assumes a first status 21, wherein the first spiral inclined surface 112 contacts closely with the second spiral inclined surface 122, and the first plane 113 contacts closely with the third plane 124, such that the body part 12 cannot displace continually along the axial direction closer to the housing part 11, and the axial length of the laser point projecting device 10 cannot continue to reduce, that is, it assumes a shortest status.

In FIG. 2, the right part shows the situation when the laser point projecting device 10 assumes a second status 22, the body part 12 displaces from the position in the first status 21 along a spiral-up trajectory, such that the first spiral inclined surface 112 departs from the second spiral inclined surface 122, and the first plane 113 and the second plane 123 contacts with each other closely. That the first plane 113 and the second plane 123 contacts with each other closely disables the body part 12 from displacing back to the first status 21 along the axial direction, thereby preventing the body part 12 from displacing axially when subjected to gravity or other external forces during operation, thereby working for position limitation. When it is necessary to recover the laser point projecting device 10 from the second status 22 to the first status 21, the body part 12 has to be displaced along the spiral direction, until it returns to the position in the first status 21.

With reference to FIG. 3, It is a schematic view of the specific structure of the laser point projecting device 10 according to another preferred embodiment of the present utility model, wherein the housing part 11 is provided on its surface with:

A First Groove 115

The first groove 115 extends along the axial direction, that is, along the direction of the generatrix of the cylinder, and perpendicular to the bottom surfaces of the cylinder. The first groove 115 can be a groove space concaving outwards, which is also cylinder-shaped with bottom surfaces that could be circular arc-shaped or rectangular.

The body part 12 is provided on its surface with a third projection part 125, the extending direction of which is parallel to the first groove 115, that is, the third projection part 125 extends along the generatrix of the body as well. The third projection part 125 has a shape fitting with that of the first groove 115, and is embedded in the first groove 115. There can be a displacement between the first groove 115 and the third projection part 125 along the axial direction, such that the body part 12 displaces in the axial direction relative to the housing part 11. In the present embodiment, the body part 12 can only displace along the axial direction, without rotation.

Figure 4:
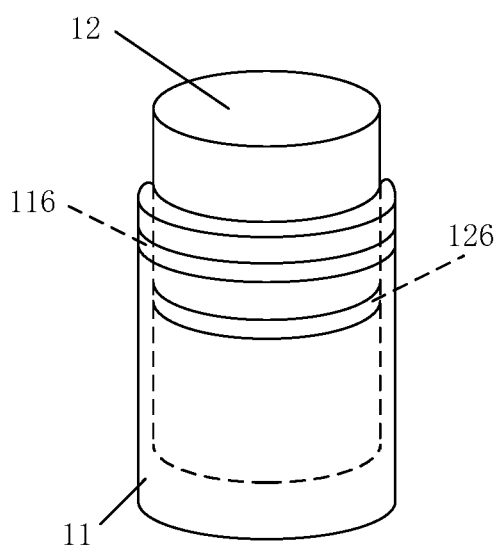
FIG. 4 is a schematic view of the specific structure of the laser point projecting device according to yet another preferred embodiment of the present utility model.

With reference to FIG. 4, It is a schematic view of the specific structure of the laser point projecting device 10 according to yet another preferred embodiment of the present utility model, wherein the housing part 11 is provided on its surface with:

A Second Groove 116

The second groove 116 extends along the radial direction of the cylinder. The second groove 116 is provided on the lateral surface of the housing part 11, with the extending direction thereof parallel to the bottom surface of the cylinder.

The body part 12 is provided on its surface with a fourth projection part 126, the extending direction of which is parallel to the second groove 116, and the shape of which fits with that of the second groove 116. When the body part 12 displaces to the second position relative to the housing part 11, that is, the laser point projecting device 10 assumes a second status, the fourth projection part 126 is embedded in the second groove 116, so as to prevent the displacement of the body part 12 relative to the housing part 11, thus working for position limitation. When the laser point projecting device 10 works in the second status, the body part 12 does not slide down by gravity, thereby guaranteeing the stability of the working status thereof. When it is unnecessary for the laser point projecting device 10 to assume the second status, the user needs to press the body part 112 by external force, so as to separate the fourth projection part 126 from the second groove 116.

Figure 5:
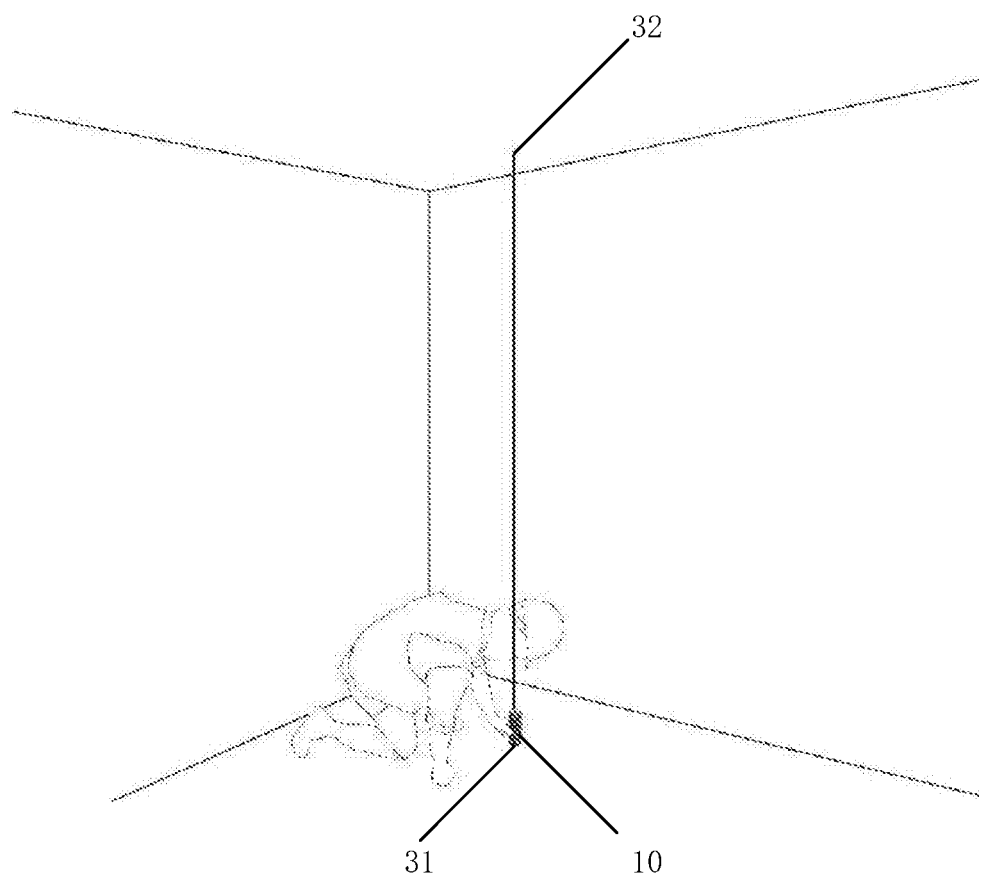
FIG. 5 is a schematic view of the working state of the laser point projecting device according to a preferred embodiment of the present utility model

With reference to FIG. 5, it is a schematic view of the working state of the laser point projecting device 10 according to a preferred embodiment of the present utility model, wherein the laser point projecting device 10 in FIG. 5 is working. The laser point projecting device 10 is placed on the ground of a room, and projects a first positioning point 31 and a second positioning point 32 in the vertical direction, wherein the first positioning point 31 is projected on the ground of the room and the second positioning point 32 is projected on the ceiling of the room, for positioning in construction. The laser point projecting device 10 is not limited to the usage in the present embodiment, but it could also be placed on a bracket to implement the positioning point projection; besides, it could project a positioning point in the horizontal direction as well.

It should be noted that the embodiments of the present utility model are of good operability, but not for constituting any limitation to the protection scope thereof. Any person skilled in the art can make alterations or modifications to the embodiments by the aforementioned technical contents, to form an equivalent and effective embodiment. Any amendments, equivalent changes and modifications to the above-mentioned embodiments based on the technical essence of the present utility model, without departing from the technical solutions of the present utility model, shall belong to the scope defined by the technical solutions of the present utility model.

What is claimed is:

1. A laser point projecting device, the device comprising a light source assembly that projects a first positioning point and a second positioning point respectively along two directions of a straight line, wherein:

the laser point projecting device comprises a housing part and a body part;

the housing part forms a sleeve on the periphery of the body part, and the housing part and the body part are displaceable relative to each other;

the laser point projecting device assumes a first status when the body part is displaced to a first position along a direction of projecting the first positioning point to switch-off the light source assembly;

the laser point projecting device assumes a second status when the body part is displaced to a second position along the direction of projecting the second positioning point to activate the light source assembly; and the housing part is provided with at least one opening at an end along the direction of projecting the first positioning point, and when the laser point projecting device assumes the second status, a hollow space is formed between an end of the housing part close to the first positioning point and the body part, and the opening acts as an observation window through which the hollow space and the external space are connected.

2. The laser point projecting device according to claim 1, wherein:

the at least one opening is fan-shaped.

3. The laser point projecting device according to claim 1, wherein:

the laser point projecting device is a cylinder, the axis of which is parallel to the straight line.

4. The laser point projecting device according to claim 3, wherein:

a first projection part comprising a first spiral inclined surface is provided on a surface of the housing part;

a second projection part comprising a second spiral inclined surface is provided on a surface of the body part; and the first spiral inclined surface is provided opposite to the second spiral inclined surface such that screw threads of the first spiral inclined surface and the second spiral inclined surface are engaged when the body part switches between the first position and the second position.

5. The laser point projecting device according to claim 4, wherein:

the first projection part further comprises a first plane provided at an upper end of the first projection part and parallel to a bottom surface of the laser point projecting device;

the second projection part further comprises a second plane provided at a lower end of the second projection part and parallel to the first plane;

when the laser point projecting device assumes the first status, the first spiral inclined surface is in contact with the second spiral inclined surface; and when the laser point projecting device assumes the second status, the body part is rotated to bring the first plane and the second plane into contact, preventing displacement of the body part relative to the housing part.

6. The laser point projecting device according to claim 1, wherein:

a first groove that extends along an axial direction is provided on a surface of the housing part;

a third projection part that extends in a direction parallel to the first groove is provided on the body part; and the third projection part is embedded in the first groove, such that the body part is displaced relative to the housing part along the axial direction.

7. The laser point projecting device according to claim 6, wherein:

a second groove that extends along the radial direction of the laser point projecting device is provided on the housing part;

a fourth projection part that extends in a direction parallel to the second groove is provided on the body part; and when the laser point projecting device assumes the second status, the fourth projection part is embedded in the second groove, preventing displacement of the body part relative to the housing part.

8. The laser point projecting device according to claim 1, wherein:

the laser point projecting device further comprises a switch;

when the laser point projecting device assumes the first status, the switch is not triggered, and the laser point projecting device is off; and when the laser point projecting device assumes the second status, the switch is triggered, and the laser point projecting device is switched on.

9. The laser point projecting device according to claim 8, wherein:

the switch is of a press-to-trigger type, provided on an upper lateral surface of the body part, and connected in series with a power circuit within the laser point projecting device; and when the laser point projecting device assumes the first status or the second status, the switch is pressed or bounced up, altering the power circuit between the states of being cut-off and being connected, respectively.

10. The laser point projecting device according to claim 1, wherein:

the laser point projecting device further comprises a switch button provided on a surface of the housing part for receiving an external operation to switch the laser point projecting device on or off.

\* \* \* \* \*